United States Patent
Pitsch et al.

(10) Patent No.: US 9,862,371 B2
(45) Date of Patent: Jan. 9, 2018

(54) SYSTEM AND METHOD FOR CONTROLLING AN ENGINE IN A HYBRID VEHICLE

(75) Inventors: Michael J. Pitsch, Ann Arbor, MI (US); Lan Wang, Troy, MI (US); Shannon E. Reeves, Wixom, MI (US); William L. Aldrich, III, Davisburg, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2025 days.

(21) Appl. No.: 12/916,809

(22) Filed: Nov. 1, 2010

(65) Prior Publication Data
US 2012/0109432 A1    May 3, 2012

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2016.01) |
| *B60K 6/48* | (2007.10) |
| *B60W 10/06* | (2006.01) |
| *B60W 10/08* | (2006.01) |
| *B60W 30/18* | (2012.01) |

(52) U.S. Cl.
CPC .............. *B60W 20/00* (2013.01); *B60K 6/48* (2013.01); *B60W 10/06* (2013.01); *B60W 10/08* (2013.01); *B60W 30/18127* (2013.01); *B60W 30/18136* (2013.01); *B60W 2510/244* (2013.01); *B60W 2540/12* (2013.01); *B60W 2710/0627* (2013.01); *B60W 2710/0633* (2013.01); *B60W 2710/0644* (2013.01); *Y02T 10/48* (2013.01); *Y02T 10/6221* (2013.01); *Y02T 10/6286* (2013.01)

(58) Field of Classification Search
CPC ...................................................... B60K 6/24
USPC .............................................................. 701/22
See application file for complete search history.

(56) References Cited

U.S. PATENT DOCUMENTS

| | | | | |
|---|---|---|---|---|
| 2002/0134596 | A1* | 9/2002 | Morimoto | B60K 6/485 180/65.26 |
| 2006/0048734 | A1* | 3/2006 | Kataoka | B60K 6/485 123/179.4 |
| 2008/0223334 | A1* | 9/2008 | Buslepp | F02D 41/0087 123/325 |

FOREIGN PATENT DOCUMENTS

CN          1745244 A       3/2006

* cited by examiner

*Primary Examiner* — Imran Mustafa
(74) *Attorney, Agent, or Firm* — Quinn IP Law

(57) ABSTRACT

A method is provided for controlling a hybrid electric vehicle. The vehicle includes at least one motor-generator, an internal combustion engine employing a camshaft and a camshaft phaser, and an energy-storage device operatively connected to the engine and to the at least one motor-generator. The method includes determining whether a deceleration of the vehicle is desired, and ceasing a supply of fuel to the engine when the deceleration is desired. The method additionally includes regulating the camshaft phaser to a predetermined fuel cut-off position when the supply of fuel to the engine has been ceased, such that a magnitude of compression pulses in the engine is reduced relative to when the engine is being fueled. A system for controlling the hybrid electric vehicle and for executing the above method is also provided.

7 Claims, 2 Drawing Sheets

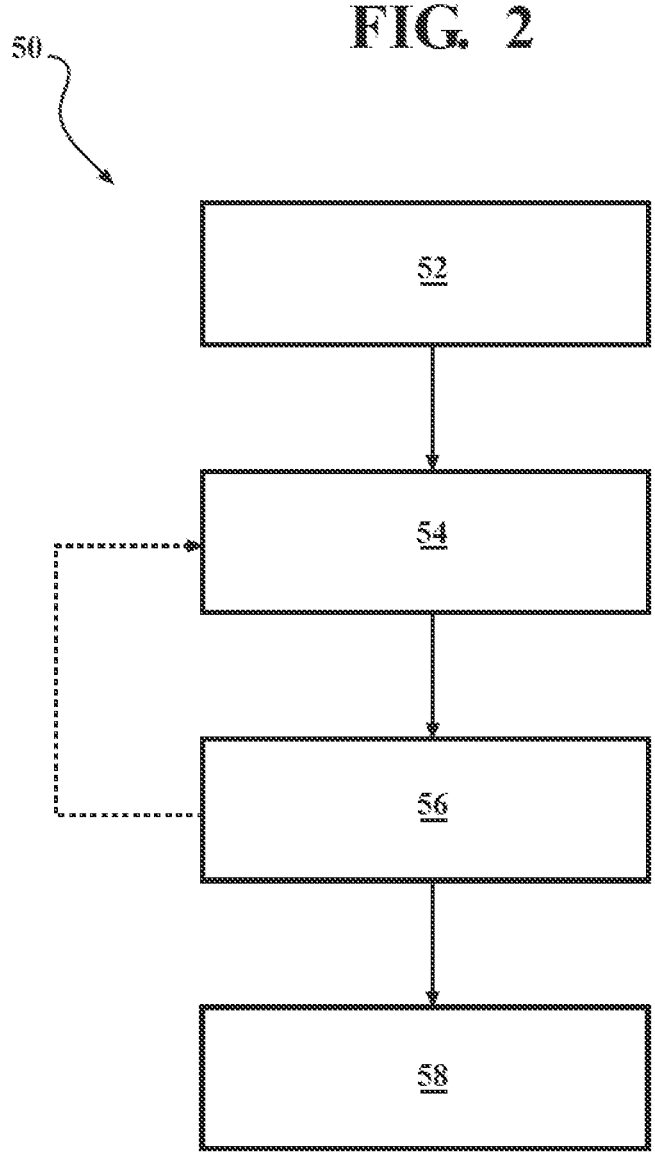

SYSTEM AND METHOD FOR CONTROLLING AN ENGINE IN A HYBRID VEHICLE

TECHNICAL FIELD

The invention relates to a system and method for controlling an internal combustion engine in a hybrid vehicle.

BACKGROUND

Among many uses for internal combustion engines, such engines are often employed for powering various vehicles, either as a primary power source, or as part of a hybrid powertrain. When an internal combustion engine is used in a hybrid powertrain, such an engine is combined with one or more electric motors to power the vehicle.

In order to maximize fuel efficiency in a hybrid vehicle during deceleration, such as coast down, i.e., when the vehicle is decelerating from elevated speeds due to road interface and vehicle driveline friction, as well as due to air resistance, or during braking, it is often desirable for the engine to be shut off. However, during such maneuvers, it may also be desirable for the engine to contribute to vehicle deceleration via engine braking through engine friction and pumping of air by the engine's cylinders.

Additionally, while the hybrid vehicle is in deceleration mode, vehicle inertia may be employed to back-drive the electric motor in generator mode for recharging vehicle batteries, thereby improving efficiency further. Hybrid vehicle deceleration may also be provided via a regenerative braking system, where the engine may likewise be shut off, and the otherwise lost braking energy is similarly recaptured via the electrical motor.

SUMMARY

A method is provided for controlling a hybrid electric vehicle. The vehicle includes at least one electric motor-generator and an internal combustion engine employing a camshaft and a camshaft phaser configured to vary a position of the camshaft. The vehicle additionally includes an energy-storage device operatively connected to the engine and to the at least one electric motor-generator. The method includes determining whether a deceleration of the vehicle is desired, and ceasing a supply of fuel to the engine when the deceleration is desired. The method additionally includes regulating the camshaft phaser to a predetermined fuel cut-off position when the supply of fuel to the engine has been ceased. Thus regulated, the phaser controls the camshaft to reduce a magnitude of compression pulses in the engine, i.e., forces of compression inside combustion chambers, relative to when the engine is being fueled.

The method may include monitoring a state of charge of the energy-storage device. In such a case, the act of regulating the camshaft phaser to a predetermined fuel cut-off position may be accomplished when the state of charge is above a predetermined minimum level. The method may also include reducing a speed of the engine via the at least one motor-generator when the deceleration is desired and the supply of fuel to the engine has been ceased.

According to one embodiment of the method, the vehicle may include a brake pedal, and the act of determining whether a deceleration of the vehicle is desired may include monitoring a position of the brake pedal. The vehicle may also include a controller, and each of said determining, ceasing, and regulating may then be accomplished via the controller.

The method may additionally include regulating the camshaft phaser to a predetermined fuel-on position and resuming the supply of fuel to the engine when the brake pedal is released and the deceleration of the vehicle is no longer desired.

The act of regulating the camshaft phaser to a predetermined fuel cut-off position may include selecting the fuel cut-off position according to a data table programmed into the controller.

Additionally, a system is disclosed for controlling such a hybrid electric vehicle, where a controller is adapted for executing the aforementioned method.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a flow chart illustrating a method for controlling regenerative braking in the hybrid electric vehicle depicted in FIG. 1.

DETAILED DESCRIPTION

Figure 1:
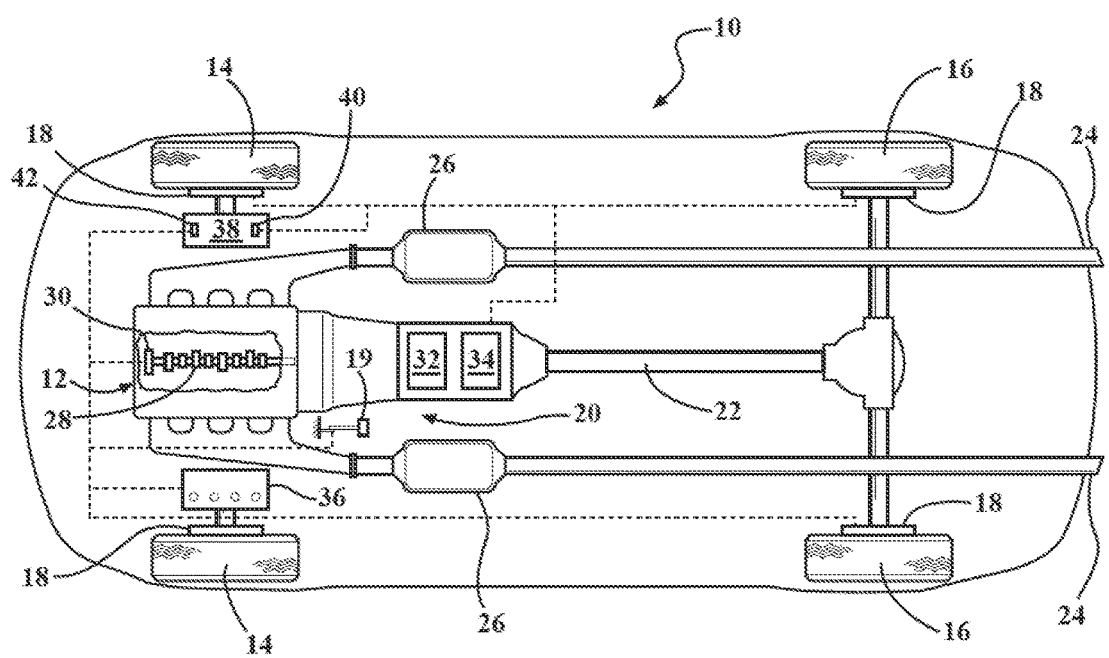
FIG. 1 is a schematic plan view of a hybrid electric vehicle.

Referring to the drawings, wherein like reference numbers refer to like components, FIG. 1 shows a schematic view of a hybrid electric vehicle (HEV) 10. The HEV 10 incorporates a powertrain that includes an internal combustion engine 12, such as a spark or a compression ignition type engine, adapted for driving wheels 14 and/or wheels 16 to propel the vehicle. Engine 12 may also be employed for engine braking, i.e., using the inertia of the HEV 10 to rotate the engine, thereby slowing the vehicle when the HEV is coasting down from elevated speed.

The hybrid vehicle 10 may also be slowed or retarded by a friction braking system that includes braking members 18. Braking members 18 are actuated by an operator of HEV 10 via brake pedal 19 when vehicle deceleration is desired, such as during stop and go portion of city traffic or when the HEV otherwise increases speed while coasting downhill. Braking members 18 typically include components such as brake rotors, brake calipers and brake pads that are commonly hydraulically actuated, as known to those skilled in the art, and are not explicitly shown. Braking members 18 are adapted to apply a frictional force to the wheels 14 and 16 for reducing speed of the HEV by dissipating the vehicle's kinetic energy as heat.

Engine 12 applies its torque to the driven wheels 14 and/or 16 through a transmission 20 and via a drive or a propeller shaft 22. The engine 12 emits gases that are a product of the combustion process via an exhaust system 24 to the ambient. The exhaust system 24 includes catalytic converters 26 that are employed to reduce toxicity of the emitted exhaust gases, i.e., exhaust emissions, prior to the gases entering the atmosphere, as understood by those skilled in the art. Engine 12 includes internal components such as a crankshaft, reciprocating pistons, and connecting rods, none of which are shown, but the presence of which will be appreciated by those skilled in the art. The pistons transfer the force of combustion to the crankshaft and thereby rotate the engine 12.

Engine 12 also includes a valvetrain system employing at least one camshaft 28 adapted to actuate intake and exhaust valves (not shown) for controlling the combustion process inside the engine. Camshaft 28 is typically driven by the crankshaft via a chain or a belt, such that the rotation of the camshaft is tied to the rotation of the crankshaft and to the position of the pistons in engine 12. Although only a single camshaft 28 is shown in engine 12, multiple camshafts may similarly be used, such as when separate camshafts are used to actuate the intake and exhaust valves of a particular engine. As will be appreciated by those skilled in the art, exhaust emissions, fuel efficiency, and power output of engine 12 may each be affected by the timing of opening and closure of the intake and exhaust valves relative to top and bottom dead center positions of the engine's piston.

Camshaft 28 is driven by the crankshaft, and is additionally operated or adjusted by a camshaft phaser 30. Camshaft phaser 30 provides engine 12 with control over the timing of opening and closing of the engine's intake and exhaust valves, i.e., variable valve timing, by varying the position of camshaft 28 relative to the crankshaft. To vary the valve timing, camshaft phaser 30 either advances or retards camshaft 28 with respect to the crankshaft of engine 12 to thereby provide the most desirable combination of exhaust emissions, fuel efficiency, and power output of the engine. Camshaft phaser 30 may be operated, for example, by oil pressure, such that hydraulic force of the oil is employed for shifting the position of the engine's camshaft 28 relative to its crankshaft, thereby varying the timing of opening and closure of the engine's valves.

The powertrain of HEV 10 additionally incorporates motor-generators 32 and 34. As shown, motor-generators 32 and 34 are positioned within the transmission 20, but may also be positioned anywhere in the HEV 10, depending on the vehicle architecture and control of the power flow. The HEV 10 is capable of being propelled by the motor-generators 32, 34 alone, or in combination with the engine 12. Although two motor-generators, 32 and 34, are shown, depending on the actual configuration of the HEV 10, only a single motor-generator may be employed within the powertrain of a subject vehicle.

A powertrain of an HEV utilizing an engine and two motor-generators may connect the engine and the motor-generators to a transmission such that torque and speed of the engine may be selected independently of vehicle speed and desired acceleration. Such control of the engine is typically achieved by varying individual torque contribution from the two motor-generators. Thus, the powertrain utilizing an engine in combination with two motor-generators may provide suitable torque contribution from each of the engine and the two motor-generators and afford improved overall vehicle efficiency Motor-generators 32 and 34 are configured to receive energy from and supply energy to an energy-storage device 36, such as one or more batteries, and may be configured to retard HEV 10 via the regenerative braking Energy-storage device 36 supplies electrical energy to power the engine 12, the motor-generators 32, 34, and other miscellaneous vehicle accessories, such as vehicle heating and ventilation system, and exterior and interior lighting. Energy-storage device 36 is configured to selectively store energy up to a maximum allowable state of charge (SOC), and release the stored energy down to a predetermined minimum SOC.

The predetermined minimum SOC of energy-storage device 36 is a low state of charge below which the energy-storage device 36 may be incapable of providing sufficient electrical current to drive the motor-generators 32, 34 for a smooth transition from regenerative braking to powering the HEV 10. Such a situation may develop when the operator of HEV 10 requests sufficient output torque from the powertrain to power the vehicle immediately following deceleration during which engine 12 was shut off Regenerative braking of HEV 10 is described in greater detail below. The predetermined minimum SOC of energy-storage device 36 may be influenced by a variety of factors, such as, the ambient temperature being too low, or a fault within the energy-storage device, as understood by those skilled in the art. A fault may be generated within the energy-storage device 36, if, for example, the internal temperature of the energy-storage device increases above a specific operating limit, such as due to a recently interrupted quick charging cycle.

In addition to the frictional braking via braking members 18, for deceleration HEV 10 may employ the regenerative braking mentioned above. Regenerative braking is a mechanism that is typically included in hybrid vehicles to decelerate the vehicle by converting some of the vehicle's kinetic energy into a storable form of energy instead of dissipating it as heat. In regenerative braking, the inertia of HEV 10 is used to drive at least one of the motor-generators 32 and 34 thus causing the driven motor-generator(s) to generate electrical current. Meanwhile, such driving of the motor-generator(s) additionally generates negative output torque from transmission 20 which acts to slow the vehicle when the HEV is coasting down from elevated speed.

The storable energy from regenerative braking is typically channeled to the energy-storage device 36 to restore its depleted SOC. Because regenerative braking recaptures otherwise lost energy, it may provide a more efficient mode of vehicle retardation than braking via members 18 of the friction braking system. Because engine 12 is not needed to power HEV 10 during regenerative braking, fuel delivery to engine 12 may be cut off, thus additionally improving vehicle efficiency. Regenerative braking typically provides a lower rate of deceleration of a subject vehicle than does the more common frictional braking accomplished via braking members 18. It may therefore be desirable to retain engine braking while engine 12 is shut off during regenerative braking to aid with the deceleration of HEV 10.

The HEV 10 also includes a controller 38 adapted to regulate the operation of engine 12, motor-generators 32 and 34, transmission 20, and members 18 of the friction braking system. Controller 38 is also adapted for monitoring the SOC of energy-storage device 36. Furthermore, controller 38 is adapted to regulate flow of engine oil to the phaser 30 to a predetermined fuel cut-off position when the supply of fuel to engine 12 has been ceased. The predetermined fuel cut-off position of phaser 30 shifts the camshaft 28 relative to the crankshaft, and relative to the position of the pistons of engine 12, such that the intake and/or exhaust valves remain open during the compression stroke longer than they would during any of the fuel-on positions of the phaser. The effective result of the fuel cut-off position of phaser 30 is that a magnitude of engine compression pulses is reduced and manifold absolute pressure is increased during fuel cut-off, as compared to when engine 12 is being fueled. The fuel cut-off position of phaser 30 may be selected from a data table 40 containing a number of discrete fuel cut-off positions of the phaser. Data table 40 may be programmed into the controller 38. The discrete fuel cut-off positions of phaser 30 may be generated during testing and development of HEV 10 in order to account for various operating conditions of the vehicle when deceleration is desired, and/or based on the SOC of energy-storage device 36.

Controller 38 may be programmed to reduce the speed of engine 12 via one of the motor-generators 32 and 30 when deceleration of vehicle 10 is desired and supply of fuel to the engine has been ceased. Controller 38 may also be adapted to determine whether a deceleration of HEV 10 is desired by the vehicle's operator via monitoring a position of the brake pedal 19. When it is determined that the deceleration of HEV 10 is desired, supply of fuel to engine 12 is regulated and ceased by the controller 38. Additionally, controller 38 may be programmed to regulate phaser 30 to the predetermined fuel cut-off position when the SOC of energy-storage device 36 is above the predetermined minimum level. When deceleration of HEV 10 is no longer desired, such as when the brake pedal 19 is released, controller 38 may regulate phaser 30 back to a predetermined fuel-on position and additionally resume the supply of fuel to engine 12. The predetermined fuel-on position of phaser 30 may be contained in a data table 42. Data table 42 may be programmed into controller 38, and contain discrete positions of phaser 30 for various operating conditions of engine 12 when the fuel is turned on.

FIG. 2 depicts a method 50 for controlling HEV 10. The method commences in frame 52 with HEV 10 progressing down the road at a measurable velocity. The method then proceeds from frame 52 to frame 54 for determining by the controller 32 whether deceleration of HEV 10 is desired. Following frame 54, in frame 56 the method includes ceasing by the controller 38 a supply of fuel to engine 12 when such deceleration is desired. Following the ceasing of the fuel supply to the engine 12 in frame 56, the method proceeds to frame 58. In frame 58, the method includes regulating the phaser 30 to the predetermined fuel cut-off position such that the magnitude of compression pulses in engine 12 is reduced compared to when the engine is being fueled.

In the course of executing method 50, the controller 38 may also include monitoring the SOC of energy-storage device 36 in frame 56. The act of regulating phaser 30 to the predetermined fuel cut-off position may then be accomplished when the SOC is above the predetermined minimum level. If the SOC of energy-storage device 36 is at or below the predetermined minimum level, the method may loop back to frame 54 and hold off ceasing to supply fuel to engine 12 until a deceleration event when SOC is above the predetermined minimum level. At the time when deceleration of HEV 10 is desired and supply of fuel to engine 12 has been ceased, the controller may additionally reduce the speed of the engine via at least one of the motor-generators 32 and 34.

The controller 38 may also monitor the position of brake pedal 19 as the indicator of whether or not the vehicle operator desires to reduce speed of HEV 10, and regulate the phaser 30 to the predetermined fuel-on position when the brake pedal is released. Additionally, the supply of fuel to engine 12 may be resumed via controller 38 when brake pedal 19 has been released thus indicating that deceleration of the vehicle is no longer desired. Method 50 may also be applied during regenerative braking of HEV 10, when at least one of the motor-generators 32 and 34 is driven in generator mode to recharge the energy-storage device 36.

While the best modes for carrying out the invention have been described in detail, those familiar with the art to which this invention relates will recognize various alternative designs and embodiments for practicing the invention within the scope of the appended claims.

The invention claimed is:

1. A method for controlling a hybrid electric vehicle having at least one motor-generator, an internal combustion engine employing a camshaft and a camshaft phaser, a controller, and an energy-storage device operatively connected to the engine and to the at least one motor-generator, the method comprising:
    determining via the controller whether a deceleration of the vehicle is desired;
    ceasing via the controller a supply of fuel to the engine when the deceleration is desired; and
    regulating via the controller the camshaft phaser to a predetermined fuel cut-off position when the supply of fuel to the engine has been ceased, such that a magnitude of compression pulses in the engine is reduced relative to when the engine is being fueled.

2. The method of claim 1, further comprising monitoring a state of charge of the energy-storage device, wherein said regulating the camshaft phaser to the predetermined fuel cut-off position is accomplished when the state of charge is above a predetermined minimum level.

3. The method of claim 1, further comprising reducing a speed of the engine via the at least one motor-generator when the deceleration is desired and the supply of fuel to the engine has been ceased.

4. The method of claim 1, wherein the vehicle includes a brake pedal, and said determining whether a deceleration of the vehicle is desired includes monitoring a position of the brake pedal.

5. The method of claim 4, further comprising regulating the camshaft phaser to a predetermined fuel-on position when the brake pedal is released.

6. The method of claim 5, further comprising resuming the supply of fuel to the engine via the controller when the brake pedal is released and the deceleration of the vehicle is no longer desired.

7. The method of claim 1, wherein said regulating the camshaft phaser to the predetermined fuel cut-off position includes selecting the fuel cut-off position according to a data table programmed into the controller.

* * * * *